May 9, 1939.   R. V. SWEENY   2,157,682
TIME CONTROLLED FEEDING DEVICE FOR DOMESTIC PETS
Filed Jan. 21, 1938
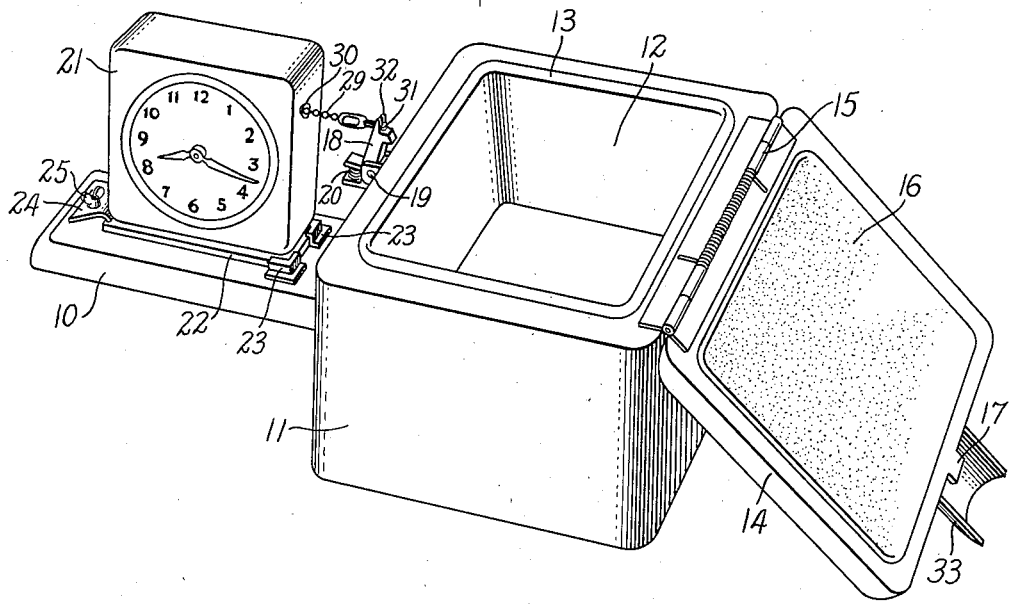
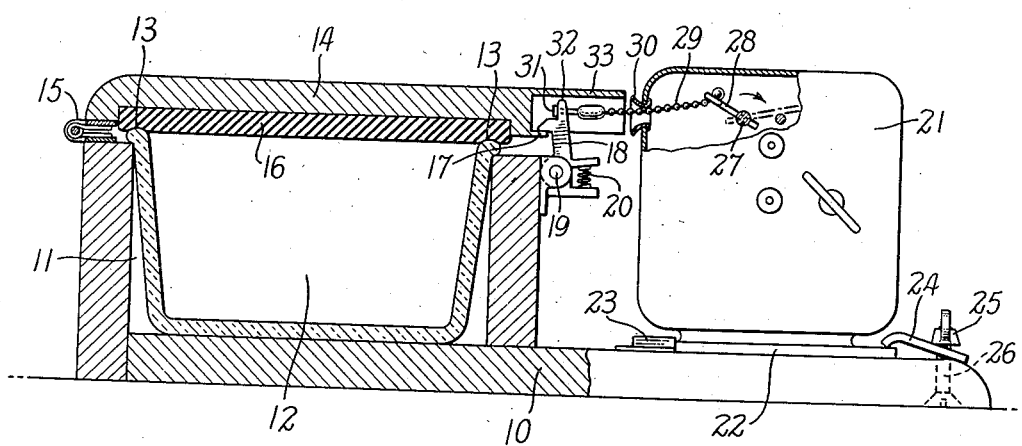
INVENTOR
Raymond V. Sweeny
BY
Clarke + Ott
ATTORNEYS Patented May 9, 1939

2,157,682

UNITED STATES PATENT OFFICE 2,157,682

TIME CONTROLLED FEEDING DEVICE FOR DOMESTIC PETS

Raymond V. Sweeny, Freeport, N. Y.

Application January 21, 1938, Serial No. 186,024

3 Claims. (Cl. 119—63)

This invention is for an improved device to feed domestic animals or pets, particularly dogs, at a predetermined time irrespective of whether or not persons are present in the household at the feeding time.

The invention is broadly directed to a device of the indicated character in which the closure for a food container which is normally moved to an open position, is retained in closed relation to the food container by a latch which is actuated by time controlled release means.

More particularly the invention resides in a food container having a cover which is adapted to be normally moved to a position to uncover the container with a latch for retaining the cover in closed condition, and a time clock mechanism having a normally inactive time actuated rotary shaft provided with a radial arm from which a flexible element extends to the latch for releasing the same when the shaft is actuated at a predetermined time.

The invention further contemplates, in a feeding device for domestic pets, a casing open at the top which receives a removable food container having a protruding bead at the upper edge adapted to be seated upon the top of the casing and a spring hinged cover provided with a yieldable gasket with latch means for holding the cover in a closed position and impinging upon and sealing the gasket against the upper edge of the food container in combination with a time controlled means for releasing the latch to permit the cover to be swung to an open position whereby the pet may gain access to the food.

As a still further object the invention comprehends latch releasing means for a food container cover which may be inexpensively incorporated in any ordinary type of alarm clock without materially altering the same or affecting its use for its ordinary purpose.

With the above and other objects in view, reference is now made to the following specification in which the invention is set forth in greater detail and to the accompanying drawing illustrating a preferred embodiment of the invention, while the appended claims cover variations and modifications which fall within the scope of the invention.

In the drawing:

Fig. 1 is a perspective view of a feeding device constructed in accordance with the invention and illustrating the cover for the food container in opened condition.

Fig. 2 is an enlarged longitudinal sectional view therethrough with the food container cover retained in closed condition and with parts of the time clock mechanism broken away to disclose the underlying structure.

Referring to the drawing by characters of reference, the feeding device includes a base 10 which carries a casing 11 open at the top and designed to removably receive a food container 12 which is also open at the top and provided with an external bead 13 at its upper edge which is adapted to rest upon the upper edge of the casing 11 when the food container is emplaced in the casing.

The casing is provided with a cover 14 which is swingably carried thereby by means of a spring hinge 15 which normally swings the cover to an opened relation with reference to the casing and food container as illustrated in Fig. 1 of the drawing. The cover is provided on the undersurface thereof with a yieldable resilient gasket 16 of rubber or any equivalent material which, when the cover is in closed position, as illustrated in Fig. 2, impinges upon the upper beaded edge of the food container 12 to seal the same against the entrance of dust, dirt, insects or other foreign matter, while serving to prevent spoiling of the food and the escape of odors from the container.

In order to retain the cover in closed relation to the food receptacle and casing, a keeper lip 17 is formed on the cover with which a latch 18 is adapted to engage, the latch being pivoted on the casing as at 19 and normally urged in a position to engage the keeper by a spring 20.

A clock 21 is also carried by the base 10 and is preferably removably retained in place thereon so that the same may be used for other purposes, if desired. As illustrated, the lower flange 22 of the clock casing is fitted within corner brackets 23 secured to the base and is engaged by a clamp piece 24 which is displaceably held in active positive by a thumb nut 25 threaded onto a stud 26.

In practice practically any ordinary type of alarm clock 21 may be used for the purpose of releasing the latch 18 at any predetermined set time and it is not deemed necessary to illustrate the clock mechanism further than to disclose the alarm shaft 27 which revolves at a predetermined time controlled by the setting of the alarm sounding mechanism. The only changes required are to provide the alarm shaft 27 with a radial arm 28 which may be in the nature of a cotter pin inserted through an opening in the alarm shaft. A flexible element, such as the chain 29, is connected with the arm 28 and extends through an opening 30 formed in the clock casing, the terminal element 31 of the chain being removably engaged in the bifurcated extremity 32 of the latch 18. It is, of course, understood that the alarm shaft rotates when actuated in the direction indicated by the arrows so as to exert a pull on the flexible element or chain 29 in a direction to release the latch 18 from the keeper 17.

In order to prevent the dog or other pet from possibly releasing the latch before the predetermined time, a shield or guard element 33 is also formed on the cover to extend over the chain and latch as illustrated in Fig. 2 of the drawing.

In event the animal or pet is to be left for any considerable time approximately the feeding time, the food is placed in the container 12 and the container is arranged within the casing 11. The cover 14 is closed and latched in its closed condition as illustrated in Fig. 2. The time when the alarm shaft 27 is to be actuated is set and without further attention the latch will be released at the predetermined time set to permit the cover to be swung to the open position illustrated in Fig. 1 so as to render the food available to the animal.

In addition to serving as a means for rendering food available to the animal when persons are absent from the household at feeding time, the device is also adapted to insure the regular feeding of the animal even when persons are present in the household as the food may be placed in the receptacle, the time mechanism set and the cover closed.

What is claimed is:

1. In a feeding device for domestic pets, a food container having an external bead at its upper edge, an open top casing upon the upper edge of which the bead is seated, a cover hinged to said casing, means for normally swinging said cover to an open position whereby the free edge portion contacts with the supporting surface upon which the casing rests, a keeper on said cover, and a pivoted latch on said casing engageable with said keeper to retain the cover in closed relation with the food container, said latch being adapted to be connected with time controlled means for releasing the same.

2. In a feeding device for domestic pets, a food container having an external bead at its upper edge, an open top casing upon the upper edge of which the bead is seated, a cover hinged to said casing, means for normally swinging said cover to an open position whereby the free edge portion contacts with the supporting surface upon which the casing rests, a keeper on said cover, and a pivoted latch on said casing engageable with said keeper to retain the cover in closed relation with the food container, said latch being adapted to be connected with time controlled means for releasing the same, said cover including a shielding element at the free edge of said cover to protect the latch against release by the pet.

3. A feeding device for domestic pets including a base, an open top casing carried by and closed at the bottom by said base, a removable food container arranged within said casing, a spring hinge cover for said casing normally swung to an open relation, a latch engageable with the cover for holding the same in covering relation to the casing and food container and adapted to be connected with a time controlled releasing device mounted on said base, and an element on said cover shielding the latch and the exposed portion of the connection with the releasing device so as to prevent release of the latch by the pet.

RAYMOND V. SWEENY.